United States Patent [19]
Zaschel

[11] Patent Number: 5,549,009
[45] Date of Patent: Aug. 27, 1996

[54] APPARATUS FOR DETERMINING AND DOSING MASS FLOWS

[75] Inventor: Jörg Zaschel, Reutlingen, Germany

[73] Assignee: Joerg Zaschel, Reutlingen, Germany

[21] Appl. No.: 546,154

[22] Filed: Oct. 20, 1995

Related U.S. Application Data

[63] Continuation of Ser. No. 144,622, Nov. 1, 1993, abandoned, which is a continuation of Ser. No. 754,896, Sep. 4, 1991, abandoned.

[30] Foreign Application Priority Data

Sep. 4, 1990 [DE] Germany ............... 40 27 936.7

[51] Int. Cl.$^6$ ......................................... G01F 1/00
[52] U.S. Cl. ......................................... 73/861.355
[58] Field of Search .................... 73/861.37, 861.38, 73/32 A; 222/14, 59, 63, 71

[56] References Cited

U.S. PATENT DOCUMENTS

| | | | |
|---|---|---|---|
| 2,624,198 | 1/1953 | Pearson | 73/194 |
| 3,355,944 | 12/1967 | Sipin | 73/194 |
| 4,105,138 | 8/1978 | Lehmann et al. | 222/14 |
| 4,422,338 | 12/1983 | Smith | 73/861.38 |
| 4,738,143 | 4/1988 | Cage et al. | 73/861.38 |
| 4,738,144 | 4/1988 | Cage | 73/861.38 |
| 4,793,191 | 12/1988 | Flecken et al. | 73/861.38 |
| 4,823,614 | 4/1989 | Dahlin | 73/861.38 |
| 4,831,885 | 5/1989 | Dahlin | 73/861.38 |
| 4,877,051 | 10/1989 | Day | 137/486 |
| 4,895,031 | 1/1990 | Cage | 73/861.38 |
| 4,962,671 | 10/1990 | Stansfeld et al. | 73/861.37 |

FOREIGN PATENT DOCUMENTS

| | | |
|---|---|---|
| 0189230 | 7/1986 | European Pat. Off. . |
| 0109218 | 2/1987 | European Pat. Off. . |
| 0300301 | 1/1989 | European Pat. Off. . |
| 0301568 | 2/1989 | European Pat. Off. . |
| 1498446 | 1/1969 | Germany . |
| 2330010 | 10/1974 | Germany . |
| 2822087 | 12/1978 | Germany . |
| 2833037 | 2/1979 | Germany . |
| 2944386 | 5/1980 | Germany . |
| 3520881 | 1/1986 | Germany . |
| 3443234 | 6/1986 | Germany . |
| 8712331.2 | 3/1988 | Germany . |
| 3632851 | 4/1988 | Germany . |
| 3824351 | 1/1990 | Germany . |
| 58-178217 | 10/1983 | Japan . |
| 2202631 | 9/1988 | United Kingdom . |

OTHER PUBLICATIONS

"Massedurchflussmessung Mit Hilfe Der coriolis–Kraft"By D. Mettlen (Technisches Messen ™, 53 Jahrgang, Heft Dec. 1986) pp. 455–461.
Patent Abstracts of Japan: JP 1–49917 p. 882, Jun. 12, 1989, vol. 13/No. 250 (1 page).

*Primary Examiner*—Hezron E. Williams
*Assistant Examiner*—Ronald Biegel
*Attorney, Agent, or Firm*—Flynn, Thiel, Boutell & Tanis, P.C.

[57] ABSTRACT

A mass flow determination apparatus according to the Coriolis principle, particularly suitable as a component of an automatic dosing apparatus to obtain a highly precise measured value formation. The measuring pipe is vibration-decoupled from the process piping to prevent the internal vibration of the measuring pipe required for the measurement according to the Coriolis principle from passing into the process piping, as well as those which specifically prevent the penetration of external vibrations from the process piping into the measuring pipe.

6 Claims, 3 Drawing Sheets

APPARATUS FOR DETERMINING AND DOSING MASS FLOWS

This application is a continuation of U.S. Ser. No. 08/144,622, filed Nov. 1, 1993 now abandoned, which is a continuation of U.S. Ser. No. 07/754,896, filed Sep. 4, 1991, now abandoned.

BACKGROUND OF THE INVENTION

The invention relates to an apparatus for determining mass flows according to the Coriolis principle, as well as to an advantageous construction of this apparatus as an automatic mass dosing machine.

Such apparatuses are e.g. used in production and testing installations in the chemical and pharmaceutical industries, as well as the plastics, beverages, food, feed and paper industries. Another field of use is research in industry and Universities.

Dosing apparatuses for liquids are commercially available in the most varied forms. For example, dosing pumps are known, which in a first working stroke fill a given volume with the liquid to be dosed and then eject said volume in the following stroke. In addition, dosing apparatuses are known, which can be based on a mechanical volumetric meter, which can e.g. be an oval wheel meter or counter or a turbine, operated in a plant equipped with additional regulating and control means. In order to obtain with the aid of the known dosing apparatuses both precise and long term-stable results, it is necessary to standardize the volume to be measured to reference temperature, density and viscosity values. This requires complicated measuring and calculating means. Further disadvantages relate to mechanical wear between moving parts, high maintenance costs with frequent replacement of parts, no constant, but instead a pulsating measuring material flow, as well as the impediment thereof, e.g. by the pipe cross-section. Finally, the known dosing apparatuses are relatively expensive.

It is also known for the purpose of dosing liquids to use balances (Weinberg, H.: Gemenge- und Dosiertechnologie, Expert Verlag GmbH 1989). Such dosing apparatuses suffer from the serious disadvantage that the mass of the measuring material in the case of a fluid can only be determined discontinuously, i.e. by interrupting the mass flow.

Finally mass flow determination apparatuses of the aforementioned type are known, i.e. those which utilize the Coriolis acceleration as the measuring principle for the flow measurement. Such apparatuses are e.g. known from U.S. Pat. Nos. 2,624,198 and 3,355,944. Although these known apparatuses permit a continuous determination of the mass flow, they can only be used to a limited extent as dosing apparatuses and even then involve a relatively high additional regulating and control effort and expenditure. Another serious disadvantage of mass flow determination apparatuses based on the Coriolis principle is that this measuring principle is very sensitive to the coupling in of vibrations from the outside and the coupling out of vibrations into the process pipe. The coupling in of vibrations or vibration leaks lead to a varying degree of falsification of the measured values. It must be borne in mind that the sensor of the apparatus is unable to distinguish between planned vibrations supplied to the measuring pipe by apparatus-internal vibration generators and vibrations introduced from the outside. In addition, vibration leaks or losses cannot be detected by the sensor.

SUMMARY OF THE INVENTION

The object of the present invention is to provide an apparatus for determining mass flows of the aforementioned type, which ensure a high measuring accuracy, so that said apparatus can also be used for very precise mass dosing apparatuses. Another object of the present invention is to provide simple, but highly precise automatic mass dosing machines. Thus, the essence of the invention is a vibration decoupling of the measuring pipe from the process pipe. This ensures a fault-insensitive operation of the mass flow determination apparatus and namely to such an extent that the inventive apparatus can be used for highly precise mass dosing apparatuses.

Whereas in the case of the known determination apparatuses operating according to the Coriolis principle there is a rigid coupling between the measuring pipe and the process pipe, inventive decoupling measures are provided for the relevant connecting sections and can be realized in different ways. The inventively proposed realizations can be roughly subdivided into two groups, namely into an internal vibration compensation preventing a leakage of vibrations to the process pipe and an external vibration compensation, which prevent the introduction of vibrations from the process pipe into the preferably single measuring pipe or parallel measuring pipes and optionally assists the internal vibration compensation.

According to a preferred variant of the internal vibration compensation a measuring pipe support is provided to which the measuring pipe is fixed and the measuring pipe and support are so matched to one another from the vibration standpoint that measuring pipe and support vibrations at the connection points of said pipe and said support are compensated. In other words via the critical connection points of the measuring pipe to the process pipe no vibration components of the internal vibration system pass into the process pipe, so that a vibration leak is effectively prevented.

Advantageously the measuring pipe support is constructed as a solid frame with two front plates in which the measuring pipe is fixed. It is advantageously provided as a supporting measure that vibration systems formed from the measuring pipe and the measuring pipe support are placed in vibrating manner in an outer frame or casing.

Finally, as a subsidiary measure for the internal vibration compensation an antiresonator can be provided. This is a resonatable structure not traversed by the mass flow to be determined and which is also connected at the connection points of the measuring pipe to the support and whose resonant frequency substantially coincides with that of the measuring pipe. In a preferred, simple version the antiresonator is alternatively constructed as a pipe or rod, the pipe or rod extending parallel to the measuring pipe.

The aforementioned external vibration compensation is inventively advantageously achieved in that the decoupling means comprise vibration-absorbing pipe elements by means of which the measuring pipe is connected to the process pipe. These vibration-absorbing pipe elements which are less rigid than the measuring pipe and the process pipe prevent a penetration of vibrations from the process pipe into the inner vibration system and optionally any exiting of vibration energy from the internal vibration system into the process pipe. Advantageously the vibration-absorbing pipe elements are constructed integrally with the measuring pipe.

According to a particularly advantageous variant the vibration-absorbing pipe elements are suspended on a support structure, which has a greater rigidity than that of the pipe elements. Thus, vibration energy entering the vibration-absorbing pipe elements is led off into the support structure, which is in turn not connected to the measuring pipe support.

The inventive mass flow determination apparatus, as a result of its high degree of fault insensitivity, is particularly suitable for dosing masses. Thus, according to an advantageous development of the invention the vibration-decoupled measuring pipe is connected at the outlet side to a dosing apparatus.

Advantageously the combination of the measuring pipe and dosing apparatus is in the form of an automatic dosing apparatus. To this end the dosing apparatus is provided with a control element connected to the measuring pipe outlet. The control element is preferably a control valve or a pump. For the automatic control and operation of the dosing apparatus an electronic control circuit is provided with an input for the fluid quantity to be dosed and a control quantity formation circuit supplied with actual flow value and the dosing value and which provides a control signal to the control element.

The invention is described in greater detail hereinafter relative to the drawings.

DESCRIPTION OF THE PREFERRED EMBODIMENTS

Figure 1:
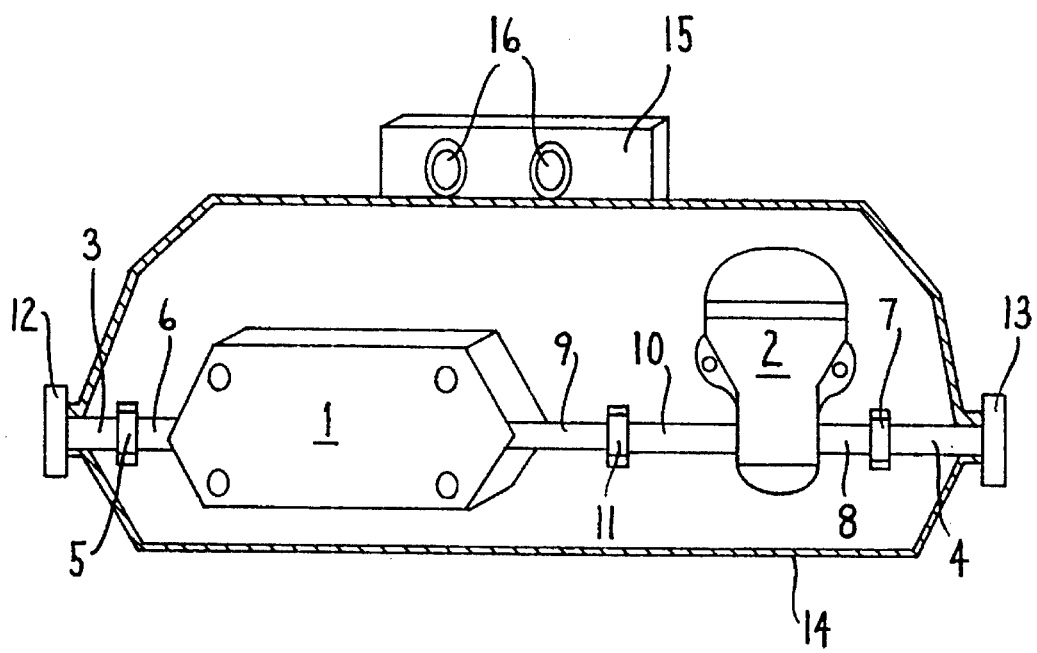
FIG. 1 shows an inventive automatic dosing apparatus in a diagrammatic, part sectional form.

The dosing apparatus diagrammatically shown in FIG. 1 comprises a transducer 1, a control valve 2, a dosing apparatus inlet 3 and a dosing apparatus outlet 4. The inlet 3 and the outlet 4 are in each case constructed as pipes terminally provided with flanges 12 and 13 and the inlet 3 is connected via an inner flange 5 to the transducer inlet 6, whilst the outlet 4 is connected via a flange 7 to the outlet 8 of the control valve 2. The transducer 1 also has an outlet 9 and the control valve 2 an inlet 10. The inlet and outlet of the transducer 1 and the control valve 2 are also constructed as pipes. For connecting the transducer outlet 9 to the control valve inlet 10 a further flange connection 11 is provided. The aforementioned parts, with the exception of the outer flange connections 12 and 13 of the dosing apparatus inlet 3 and the dosing apparatus outlet 4, are located within a common, all-round closed casing 14 and are fixed by screws to the inner wall of the casing, the screws 60 passing through the encapsulated transducer 1 and the mounting flanges 62 of the control valve 2. Externally, a measuring and control circuit is located on the casing 14 and is housed in its own casing 15, whose one wall carries bushes 16, which are connected to an inner circuit and are connected via not shown connecting lines to not shown bushes on the casing 14, which are in turn connected to terminals of the transducer 1 and the control valve 2 and which are also not shown.

The dosing apparatus is connected via the inlet 3 and the outlet 4 to not shown process piping. As a result, measuring material coming from the inlet 3 passes via the transducer 1 to the control valve 2 and from there to the outlet 4. The transducer 1 establishes the actual value of the mass flow with the aid of the control circuit, which controls the control valve 2 with a predetermined desired value for the mass flow.

Figure 4:
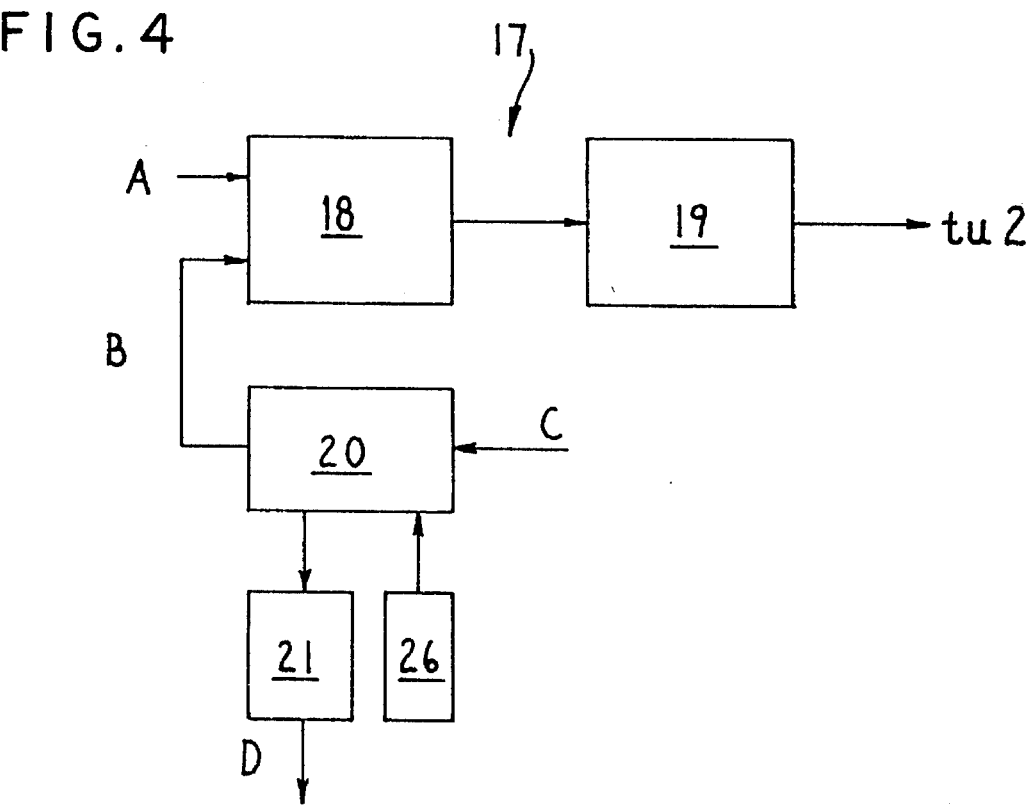
FIG. 4 a block circuit diagram of the dosing apparatus control circuit.

The block circuit diagram of the control circuit is shown in FIG. 4. The control circuit 17 comprises a regulator 18 supplied with the mass flow desired value A and the mass flow actual value B and which determines a control value and supplies it to a driver 19 by means of which the control valve 2 is controlled, namely adjusted. The actual mass flow sensed by conventional means is fed at C into a measuring device 20, which comprises the transducer 1, a signal processing part and an evaluating unit. By means of an output unit 21 connected to the measuring device 20 dosing values are shown in the form of displays D or in the form of electric signals.

Figure 2:
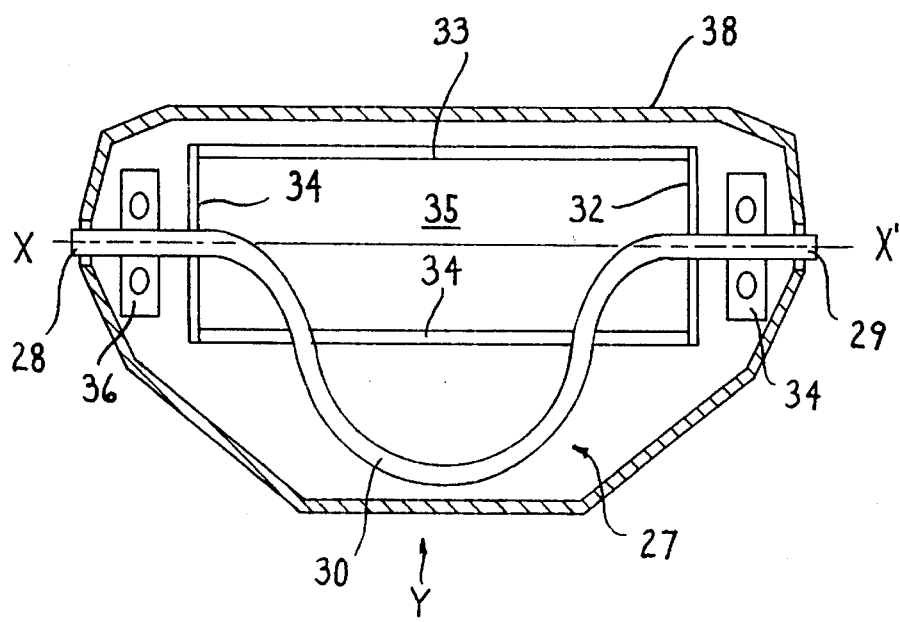
FIG. 2 a section through the transducer or massflow determination apparatus of the dosing apparatus of FIG. 1.

As can be seen in FIG. 2 the essential part of the transducer 1 is a single measuring pipe 27, which comprises linear inlets and outlets 28,29 and a curved, central portion 30. The inlet 28 and outlet 29 are aligned on a common axis X—X' located in a common plane with the curved pipe section 30. In the vicinity of its inlet 28 and outlet 29 the measuring pipe 27 is fixed in plates 31 and 32, which are rigidly interconnected by means of struts 33 and 34 to form a support frame 35. The arrangement formed by the support frame 35 and the measuring pipe 27 is fixed such as by screws or bolts, to the transducer casing 38 by means of clamping members or brackets 36,37 via the measuring pipe inlet 28 and the measuring pipe outlet 29. As a result of the vibrating suspension of the measuring pipe support frame it is ensured that vibrations from the process pipe cannot enter the measuring pipe. The process piping is e.g. connected in rotary manner (by a rotary joint) to the inlet 28 and the outlet 29 of the measuring pipe 27. To ensure that internal vibrations of the measuring pipe 27 are not transferred to the process piping, from the vibration standpoint, pipe 27 and support 35 are so matched or detuned to one another that the measuring pipe and support vibrations are compensated at the measuring pipe-support connection points.

Figure 3:
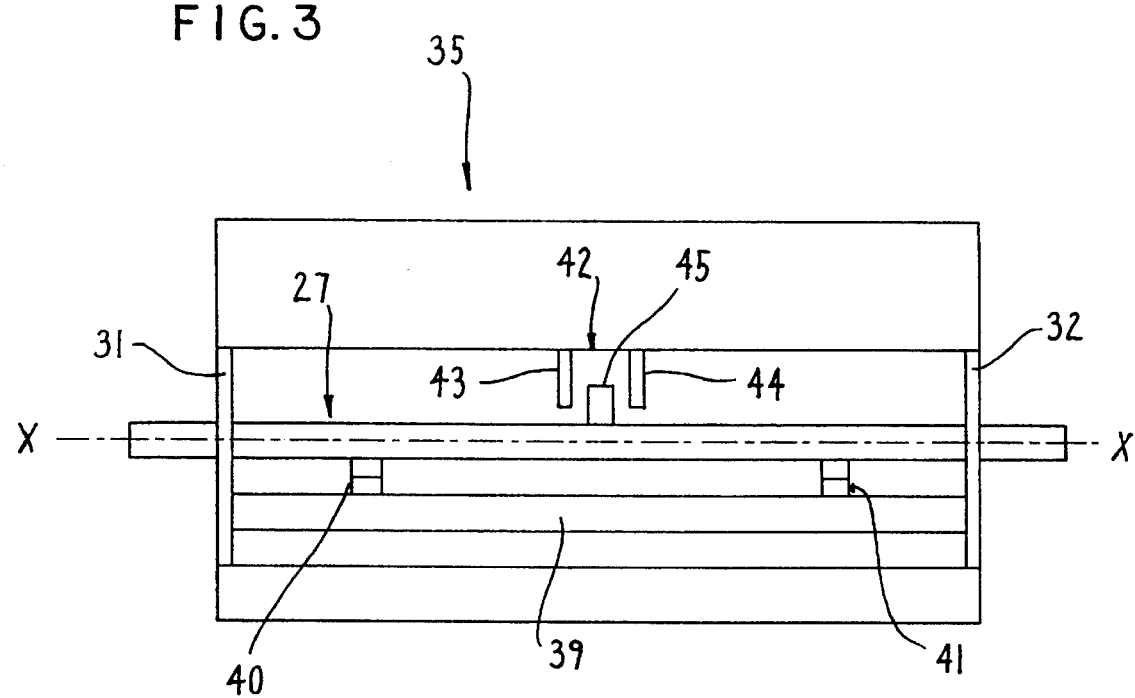
FIG. 3 a view of the mass flow determination apparatus of FIG. 1 along arrow Y of FIG. 2.

Another view of the transducer of FIG. 2 is provided in FIG. 3 in a plan view along the arrow Y in FIG. 2, so that the undulating measuring pipe 27 in the representation of FIG. 3 appears to assume a linear configuration. From the representation of the transducer in FIG. 3, which is at 90° compared with that of FIG. 2, it becomes clear that the support frame 35 contains, in addition to the measuring pipe 27, an antiresonator 39 in the form of a pipe curved in accordance with the measuring pipe and through which the measuring fluid does not flow and which runs parallel to the lines X—X. The antiresonator 39 has a natural resonance, whose frequency substantially coincides with that of the measuring pipe 27 through which the measuring fluid flows. As a result a matched, internal vibration system is formed comprising the measuring pipe 27, the support frame 35 and the antiresonator 29. This vibration matching is e.g. achieved by the per se known finite element methods. In the curvature area known position sensors 40,41 are fitted to the antiresonator 39 and sense the position of the vibrating measuring pipe 27. Suitable sensors are e.g. electrodynamic, piezoelectric, optical or magnetostrictive sensors.

The measuring pipe 27 is made to vibrate by a vibration generator 42, which is constructed in per se known manner and comprises two exciting elements 43,44, which are fixed to the support frame 35 and a further exciting element 45, which is fixed to the measuring pipe 27.

The measuring pipe 27 is made to rotary vibrate about the axis X—X' by the vibration generator 42. By its superimposing with the flow rate of the measuring material flowing in the measuring pipe 27 Coriolis accelerations occur in the curved pipe section 30 and in known manner produce with the mass of the measuring material instantaneously located in the pipe section 30 Coriolis forces, which act at their formation points on the measuring pipe 27 and are detected by sensors 40,41, which supply electric output signals to the circuit 17. The vibration generator 42 is connected to an oscillator 26 (FIG. 4) of the circuit 17 and is driven by it in the known manner.

Figure 5:
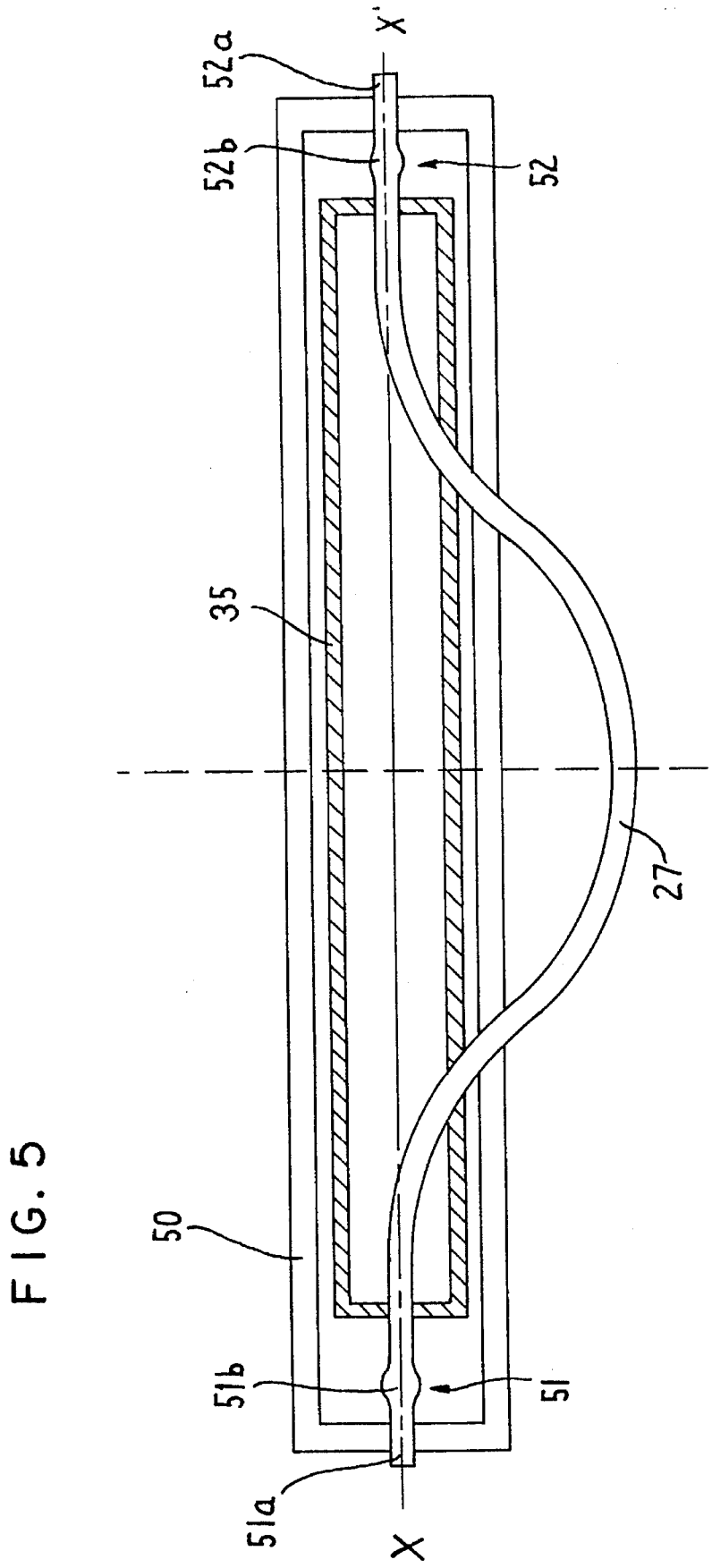
FIG. 5 another embodiment of the inventive vibration-decoupled mass flow determination apparatus.

FIG. 5 shows another embodiment of the measuring pipe suspension within the transducer casing 38. The measures or means for the vibration decoupling of the measuring pipe 27 from the not shown process piping comprise, according to FIG. 5, apart from the support frame 35 described in connection with FIG. 2, a further frame structure 50, in which are fixed vibration-absorbing pipe elements 51 and 52. The pipe elements 51 and 52 replace the measuring pipe inlet and outlet pipes 28 and 29 of FIG. 2 and comprise rigid pipe sections 51a and 52a, which are fixed to the frame structure 50 and connected to the process piping. In addition, the pipe elements 51 and 52 comprises "softer" (bulged) sections 51b and 52b via which they are connected to the measuring pipe 27. The word "softer" refers to the bending, torsional, longitudinal or tensile and compressive rigidity of the bridge pipe parts 51b and 52b, said rigidities being much less with respect to those of the frame structure 50. As a result of this measure, vibrations of the process pipe are introduced into the frame structure and destroyed, without said parasitic vibrations being introduced into the system formed by the support frame 35 and the measuring pipe 27, which represent parts of an internal vibration system, which prevents a leak of internal vibrations to the process piping as a result of the matching thereof and as shown in FIG. 2.

What we claim is:

1. An apparatus connectable into a process pipe for determining mass flow of a fluid flowing in the process pipe using the Coriolis principle comprising:

an outer casing to be fixed in a stationary manner;

a measuring pipe mounted in said casing and interposable in the process pipe comprising an inlet section for connection to the upstream side of a break in a process pipe, an outlet section for connection to the downstream side of the break in the process pipe, and a curved central measuring section, all sections of the measuring pipe lying in a common plane with the inlet section and outlet section aligned on a common axis and each projecting freely out of the casing;

rotary joints mounted on the inlet section and outlet section of the measuring pipe for connection with the associated sides of the process pipe;

a pair of brackets, each bracket fixing one of the inlet section and outlet section to the outer casing;

a vibration decoupling system for decoupling vibrations in the process pipe from the curved central measuring section of the measuring pipe and for decoupling vibrations in the curved central measuring section from the process pipe, said system being unconnected to said outer casing and including a pair of plates, each said plate being fixed to one of the inlet section and outlet section between the bracket fixing such section to the outer casing and the connection of such section to the curved central measuring section, a pair of struts rigidly interconnecting the pair of plates to form a support frame, an anti-resonator pipe curved in accordance with the curved central measuring section being fixedly mounted at its ends in the support frame with the curved anti-resonator pipe lying parallel to and coextending with the curved central measuring section in a plane adjacent to the said common plane and having a natural resonance that substantially coincides in frequency with that of the curved central measuring section;

said support frame including said anti-resonator pipe together with said curved central measuring section constituting a matched internal vibration system;

a pair of position sensors mounted in spaced relation on said anti-resonator pipe on the side thereof adjacent the curved central section to sense the position of same; and a vibration generator comprising an exciting element fixed to the support frame cooperating with an exciting element fixed to the curved central measuring section for causing the curved central measuring section to vibrate.

2. An apparatus according to claim 1, wherein said inlet section and said outlet section each include a bulged portion having lesser rigidity located downstream of the bracket fixing the inlet section and upstream of the bracket fixing the outlet section, respectively, and a further rigid support frame unconnected to the outer casing and fixed to each of the inlet section and outlet section between its bulged portion and its associated bracket.

3. An apparatus connectable into a process pipe for determining mass flow of a fluid flowing through the process pipe using the Coriolis principle comprising:

a first fixed support structure fixed in a stationary manner;

a measuring pipe interposable in the process pipe comprising an inlet section fixed to the first support structure for connection to the upstream side of a break in a process pipe, an outlet section fixed to the first support structure for connection to the downstream side of the break in the process pipe, said inlet and outlet sections being aligned on a common axis, and a curved central measuring section with all sections lying in a common plane;

a vibration decoupling means unconnected to the first fixed support structure for decoupling vibrations in the process pipe from the curved central measuring section and for compensation of internal vibrations of the curved central measuring section, said vibration decoupling means comprising a second rigid support structure fixed to the inlet and outlet sections between their fixing points to the first fixed support structure and the curved central measuring section, said vibration decoupling means and curved central measuring section being matched to one another from the vibration standpoint such that vibrations at the fixing points between the measuring pipe and the second rigid support structure are compensated;

sensor means carried on said second rigid support structure in proximity to said curved central measuring section for sensing the position of the curved central measuring section; and a vibration generator comprising a first exciting element carried by the second rigid support structure cooperating with a second exciting element fixed to the curved central measuring section for causing the curved central measuring section to vibrate.

4. An apparatus according to claim 3, wherein the second rigid support structure includes a curved anti-resonator pipe lying parallel to and co-extending with the curved central measuring section, said anti-resonator pipe having a resonant frequency substantially coinciding with that of the curved central measuring section.

5. An apparatus according to claim 3, wherein said inlet section and said outlet section each include a bulged portion of lesser rigidity located upstream and downstream, respectively, of the fixing points of the second rigid support structure; and further including a third rigid support structure unconnected to the first fixed support structure fixed to the inlet and outlet sections upstream and downstream, respectively, of the bulged portions.

6. An apparatus according to claim 3, wherein rotary joints are provided for connection of the upstream end of the inlet section and the downstream end of the outlet section, respectively, to the process pipe.

* * * * *